(12) United States Patent
Wada

(10) Patent No.: US 8,274,585 B2
(45) Date of Patent: Sep. 25, 2012

(54) IMAGING DEVICE WITH BRIGHTNESS CORRECTION

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 849 days.

(21) Appl. No.: 12/129,485

(22) Filed: May 29, 2008

(65) Prior Publication Data

US 2008/0297633 A1 Dec. 4, 2008

(30) Foreign Application Priority Data

Jun. 1, 2007 (JP) ................................ P2007-146639

(51) Int. Cl.
  H04N 3/14 (2006.01)
  H04N 5/335 (2011.01)
  H04N 5/228 (2006.01)
  H04N 9/68 (2006.01)
  H04N 9/73 (2006.01)

(52) U.S. Cl. ...................... 348/277; 348/222.1; 348/234

(58) Field of Classification Search ............... 348/223.1, 348/272, 273, 275–277, 279–282, 234–238
See application file for complete search history.

(56) References Cited

U.S. PATENT DOCUMENTS

| | | | | |
|---|---|---|---|---|
| 5,323,233 A * | 6/1994 | Yamagami et al. | ............ | 348/277 |
| 5,530,474 A * | 6/1996 | Takei | ........................ | 348/224.1 |
| 6,476,865 B1 * | 11/2002 | Gindele et al. | ................ | 348/277 |
| 6,611,289 B1 * | 8/2003 | Yu et al. | ......................... | 348/265 |
| 6,714,243 B1 * | 3/2004 | Mathur et al. | ................. | 348/273 |
| 6,721,000 B1 * | 4/2004 | Lin et al. | ..................... | 348/223.1 |
| 6,788,339 B1 * | 9/2004 | Ikeda | .......................... | 348/223.1 |
| 7,545,412 B2 * | 6/2009 | Minakuti et al. | ........... | 348/223.1 |
| 7,663,679 B2 * | 2/2010 | Wada | ............................. | 348/277 |
| 7,769,229 B2 * | 8/2010 | O'Brien et al. | ............... | 382/167 |
| 7,812,870 B2 * | 10/2010 | Utz et al. | ....................... | 348/277 |
| 7,952,623 B2 * | 5/2011 | Wada | ............................. | 348/273 |
| 2002/0027601 A1 * | 3/2002 | Nakayama et al. | ........... | 348/223 |
| 2003/0142876 A1 * | 7/2003 | Sugimoto et al. | ............. | 382/250 |
| 2003/0202113 A1 * | 10/2003 | Yoshikawa | .................... | 348/272 |
| 2004/0196383 A1 * | 10/2004 | Suzuki et al. | ............... | 348/223.1 |
| 2004/0263649 A1 | 12/2004 | Itakura et al. | | |
| 2005/0248667 A1 * | 11/2005 | Schweng et al. | .............. | 348/234 |

(Continued)

FOREIGN PATENT DOCUMENTS

JP 2003-199117 A 7/2003

(Continued)

*Primary Examiner* — Chieh M Fan
*Assistant Examiner* — Carramah J Quiett
(74) *Attorney, Agent, or Firm* — Birch, Stewart, Kolasch & Birch, LLP

(57) ABSTRACT

An imaging device comprises: an imaging element that comprises (i) at least three types of color detection photoelectric conversion elements that detect different color components of light and (ii) brightness detection photoelectric conversion elements that detect brightness components of light; a level adjustment section that adjust levels of color signals acquired respectively from at least said three types of color detection photoelectric conversion elements and levels of brightness signals acquired from the brightness detection photoelectric conversion elements; a composite signal generation section that generates, from ones of the color signals undergone level adjustment, at least three different color signals in correspondence with each of the color detection photoelectric conversion elements and subjects at least said three color signals to weighting and addition, so as to generate composite signals respectively corresponding to the color detection photoelectric conversion elements; and a brightness signal correction section that corrects one of the brightness signals having undergone level adjustment, through use of corresponding one(s) of the composite signals.

14 Claims, 5 Drawing Sheets

U.S. PATENT DOCUMENTS

| | | |
|---|---|---|
| 2006/0139468 A1* | 6/2006 | Wada .......................... 348/272 |
| 2006/0146067 A1* | 7/2006 | Schweng et al. .............. 345/591 |
| 2007/0024879 A1* | 2/2007 | Hamilton et al. .............. 358/1.9 |
| 2007/0024931 A1* | 2/2007 | Compton et al. .............. 358/512 |
| 2007/0076269 A1 | 4/2007 | Kido et al. |
| 2007/0257998 A1* | 11/2007 | Inoue .......................... 348/272 |
| 2008/0225135 A1* | 9/2008 | Mizukura et al. .......... 348/223.1 |
| 2011/0032395 A1 | 2/2011 | Kido et al. |

FOREIGN PATENT DOCUMENTS

| | | |
|---|---|---|
| JP | 2003-318375 A | 11/2003 |
| JP | 2004-364266 A | 12/2004 |
| JP | 2006-253876 A | 9/2006 |
| JP | 2006-262084 A | 9/2006 |
| JP | 2007-104178 A | 4/2007 |
| JP | 2007-288403 A | 11/2007 |
| WO | WO 2006/064564 A1 | 6/2006 |

* cited by examiner

IMAGING DEVICE WITH BRIGHTNESS CORRECTION

BACKGROUND OF THE INVENTION

1. Field of the Invention

The present invention relates to an imaging device having an imaging element including at least three types of color detection photoelectric conversion elements for detecting different color components of light and brightness detection photoelectric conversion elements for detecting a brightness component of light.

2. Description of the Related Art

A hitherto-proposed imaging element includes a brightness detection photoelectric conversion element having a brightness filter formed on a light-receiving surface of the element; an R photoelectric conversion element having an R color filter that is formed on the light-receiving surface of the element and that allows transmission of a red (R) color component of light; a G photoelectric conversion element having a G color filter that is formed on the light-receiving surface of the element and that allows transmission of a green (G) color component of light; and a B photoelectric conversion element having a B color filter that is formed on the light-receiving surface of the element and that allows transmission of a blue (B) color component of light (see JP-A-2003-318375).

There is conceived an example in which the brightness filter of the imaging element is not provided at all at a position above the light-receiving surface of the brightness detection photoelectric conversion element. In this case, the sensitivity of signals acquired from the respective photoelectric conversion elements is as shown on the left side of FIG. 8. Since the brightness filter permits transmission of all components of light, signals from the brightness detection photoelectric conversion elements are indicated as W (white). Since the filter is not present on the light-receiving surface, the sensitivity of the signals W from the brightness detection photoelectric conversion elements is maximum. Further, the sensitivity of a G signal is generally higher than sensitivities of R and B signals. Hence, as illustrated, the sensitivities exhibit a relationship of W>G>R>B.

When a white balance of a signal acquired from the imaging element is adjusted, a level must be matched with the sensitivity of any of the signals in order to compensate for a difference among sensitivities of the signals. In consideration of color reproducibility, the G signal is generally taken as a reference. As shown on the right side of FIG. 8, the R signal, the B signal, and the W signal are multiplied by a gain so as to match with the C signal, saturation levels of the R and B signals become greater by an amount corresponding to the gain multiplied because saturation levels of the respective photoelectric conversion elements are identical. However, the saturation level of the W signal becomes smaller by an amount corresponding to the gain multiplied.

SUMMARY OF THE INVENTION

The present invention has been conceived in view of the circumstance and aims at providing an imaging device capable of increasing a dynamic range of brightness signals acquired from brightness detection photoelectric conversion elements even when there is achieved a white balance of a signal acquired from an imaging element having color detection photoelectric conversion elements and the brightness detection photoelectric conversion elements.

According to an aspect of the invention, there is provided an imaging device comprising: an imaging element that comprises (i) at least three types of color detection photoelectric conversion elements that detect different color components of light and (ii) brightness detection photoelectric conversion elements that detect brightness components of light; a level adjustment section that adjust levels of color signals acquired respectively from at least said three types of color detection photoelectric conversion elements and levels of brightness signals acquired from the brightness detection photoelectric conversion elements; a composite signal generation section that generates, from ones of the color signals undergone level adjustment, at least three different color signals in correspondence with each of the color detection photoelectric conversion elements and subjects at least said three color signals to weighting and addition, so as to generate composite signals respectively corresponding to the color detection photoelectric conversion elements; and a brightness signal correction section that corrects one of the brightness signals having undergone level adjustment, through use of corresponding one(s) of the composite signals.

In the imaging device of the present invention, the brightness signal correction section may add, at a given ratio: the one of the brightness signals having undergone level adjustment; and composite signal(s) corresponding to one(s) of the color detection photoelectric conversion elements located around one of the brightness detection photoelectric conversion elements generating the one of the brightness signals, so as to acquire signals as the corrected brightness signals.

In the imaging device of the present invention, the brightness signal correction section may combine a high-frequency component of the one of the brightness signals having undergone level adjustment with a low-frequency component of the composite signal(s) corresponding to one(s) of the color detection photoelectric conversion elements located around one of the brightness detection photoelectric conversion elements generating the one of the brightness signals, so as to acquire signals as the corrected brightness signals.

In the imaging device of the present invention, in a case where when the one of the brightness signals becomes saturated after undergoing level adjustment, composite signal(s) corresponding to one(s) of the color detection photoelectric conversion elements located around one of the brightness detection photoelectric conversion elements generating the one of the brightness signals are higher in level than the one of the brightness signals, the brightness signal correction section may perform processing for replacing a level of the one of the brightness signals with a level derived from the composite signal(s).

In the imaging device of the present invention, when the one of the brightness signals having undergone level adjustment already reached a given level which is lower than a saturation level of the brightness detection photoelectric conversion elements and when level(s) of composite signal(s) corresponding to one(s) of the color detection photoelectric conversion elements located around the one of the brightness detection photoelectric conversion elements are higher than the given level, the brightness signal correction section may perform correcting operation for replacing the one of the brightness signals having a level equal to or higher than the given level with a signal in which the one of the brightness signals and composite signal (s) having level(s) greater than the given level are combined.

In the imaging device of the present invention, when the one of the brightness signals is an imperfection signal, the imperfection signal is corrected by use of composite signal(s) corresponding to one(s) of the color detection photoelectric conversion elements located around one of the brightness detection photoelectric conversion elements generating the one of the brightness signals.

In the imaging device of the present invention, when the one of the brightness signals is an imperfection signal, the high-frequency component of the one of the brightness signals is set to 0, so as to correct the imperfection signal.

In the imaging device of the present invention, the imaging element may comprise: a first group including the color detection photoelectric conversion elements; and a second group including the brightness detection photoelectric conversion elements, and when positions of the respective photoelectric conversion elements belonging to the second group are taken as a reference, the respective photoelectric conversion elements belonging to the first group are arranged at positions offset in a given direction from the reference positions in such away that one photoelectric conversion element belonging to the first group becomes adjacent to the respective photoelectric conversion elements belonging to the second group.

In the imaging device of the present invention, the color detection photoelectric conversion elements included in the imaging element may be photoelectric conversion elements of three types, that is, a photoelectric conversion element that detects a red component of light, a photoelectric conversion element that detects a green component of light, and a photoelectric conversion element that detects a blue component of light.

DETAILED DESCRIPTION OF THE INVENTION

Embodiments of the present invention will be described hereunder by reference to the drawings.

(First Embodiment)

Figure 1:
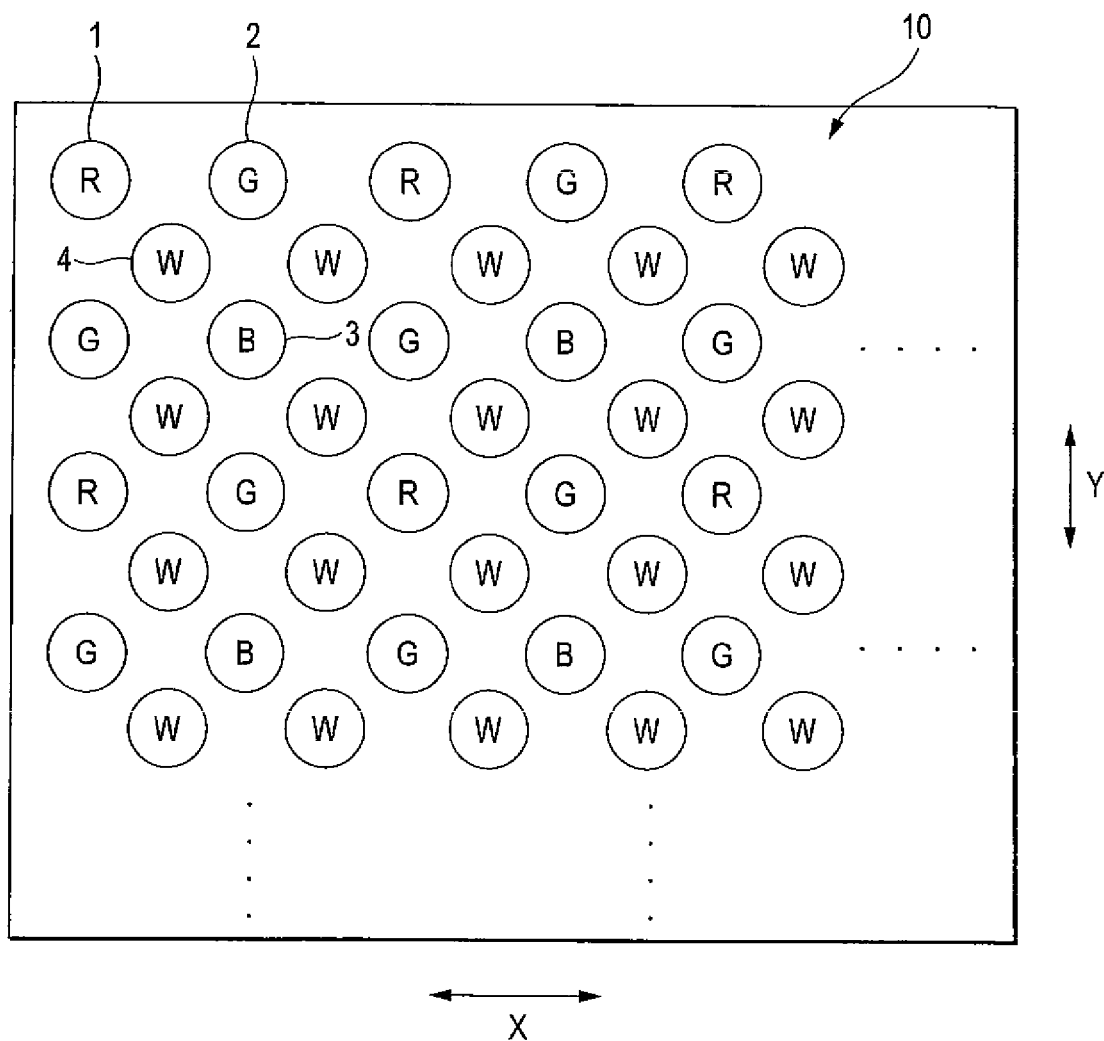
FIG. 1 is a general diagrammatic plan view of an imaging element incorporated in an imaging device that is a first embodiment of the present invention.

FIG. 1 is an essentially-plan, diagrammatic view of an imaging element incorporated in an imaging device that is a first embodiment of the present invention.

An imaging element 10 shown in FIG. 1 has a first group and a second group. The first group includes a plurality of photoelectric conversion elements (1, 2, and 3) arranged in a square grid pattern in a row direction X on a semiconductor substrate and a columnar direction Y orthogonal to the row direction. The second group includes a plurality of photoelectric conversion elements (4) arranged in a square grid pattern in the row direction X and the columnar direction Y on the semiconductor substrate. The photoelectric conversion elements constituting the first group and the photoelectric conversion elements constituting the second group are equal in number to each other.

When the positions of the respective photoelectric conversion elements 4 belonging to the second group are taken as a reference, the respective photoelectric conversion elements belonging to the first group are arranged at positions offset from the reference positions in a given direction (an upper-left direction inclined at an angle of 45 degrees in the embodiment shown in FIG. 1) in such a way that the respective photoelectric conversion elements belonging to the second group adjoin one photoelectric conversion element belonging to the first group, and all of the photoelectric conversion elements are arranged in a so-called honeycomb pattern.

The photoelectric conversion elements 1 through 4 have the same structure and are arranged to detect different components of light by means of filters formed at positions above respective light-receiving surfaces of the elements.

An R color filter for permitting transmission of a red (R) component of light is formed on the light-receiving surface of the photoelectric conversion element 1, whereby the photoelectric conversion element 1 acts as a photoelectric conversion element for detecting an R component of light. A G color filter for permitting transmission of a green (G) component of light is formed on the light-receiving surface of the photoelectric conversion element 2, whereby the photoelectric conversion element 2 acts as a photoelectric conversion element for detecting a G component of light. A B color filter for permitting transmission of a blue (B) component of light is formed on the light-receiving surface of the photoelectric conversion element 3, whereby the photoelectric conversion element 3 acts as a photoelectric conversion element for detecting a B component of light. A brightness filter exhibiting a spectral characteristic having correlation to a brightness component of light is formed on the light-receiving surface of the photoelectric conversion element 4, whereby the photoelectric conversion element 4 acts as a photoelectric conversion element for detecting a brightness component of light.

The brightness filter corresponds to an ND filter, a transparent filter, a white filter, a gray filter, and the like. However, a configuration in which nothing is provided at a position above the light-receiving surface of the photoelectric conversion element 4, to thus permit direct entrance of light into the light-receiving surface can also be said to be a configuration provided with a brightness filter.

An imaging signal of a red component acquired from the photoelectric conversion element 1 is hereinafter called an R signal; an imaging signal of a green component acquired from the photoelectric conversion element 2 is hereinafter called a G signal; an imaging signal of a blue component acquired from the photoelectric conversion element 3 is hereinafter called a B signal; and a brightness signal acquired from the photoelectric conversion element 4 is hereinafter called a W signal. In terms of the magnitude of sensitivity, the signals output from the respective photoelectric conversion elements 1 through 4 are arranged in order of; for example, the W signal>the G signal>the R signal>the B signal.

The color filters formed at the positions above the light-receiving surfaces of the respective photoelectric conversion elements belonging to the first group employ a Bayer arrangement. Specifically, the photoelectric conversion elements of the first group are arranged in such a way that RG photoelectric conversion element lines, in which the photoelectric conversion elements 1 and the photoelectric conversion elements 2 are arranged one after another in this sequence in an X direction, and GB photoelectric conversion element lines, in which the photoelectric conversion elements 2 and the photoelectric conversion elements 3 are arranged in this sequence one after another in the X direction, are arranged alternately in a direction Y.

Figure 2:
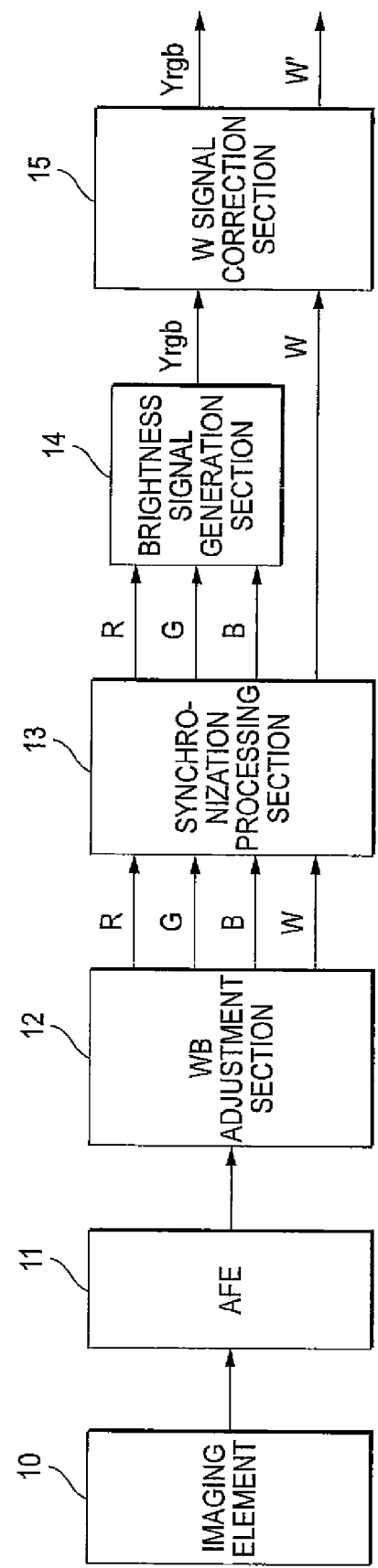
FIG. 2 is a block diagram showing a general configuration of the imaging device that is the first embodiment of the present invention.

FIG. 2 is a block diagram showing a general configuration of an imaging element that is a first embodiment of the present invention.

The imaging device shown in FIG. 2 includes at least the imaging element 10 shown in FIG. 1; an AFE 11 that subjects an analogue signal output from the imaging element 10 to given analogue signal processing and given digital conversion processing; a WB adjustment section 12 for adjusting a white balance of a signal output from the AFE 11; a synchronization processing section 13 that performs synchronization processing for imparting color signal of three colors RGB to one imaging point; a brightness signal generation section 14; and a W signal correction section 15.

The WB adjustment section 12 multiplies a given white balance gain to the R signal, the G signal, the B signal, and the W signal, respectively, to thus adjust a difference in sensitivities (level difference) of the signals. For instance, a white balance gain for compensating for a difference between the sensitivity of the G signal and the sensitivities of the R, B, and W signals is multiplied by the R signal, the B signal, and the W signal, thereby adjusting a white balance.

By means of the adjustment, a saturation level of the R signal and a saturation level of the B signal become greater than a saturation level of the G signal, so that a pseudo color of violet appears in a high brightness area. Accordingly, in order to prevent occurrence of the pseudo color, the WB adjustment section 12 clips the saturation level of the R signal and the saturation level of the B signal to the saturation level of the G signal.

Figure 3:
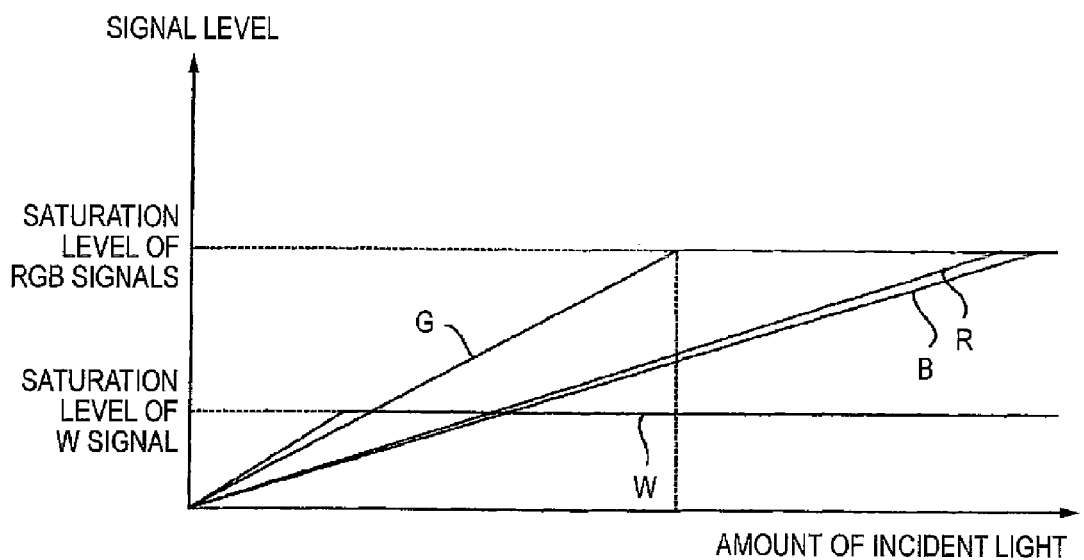
FIG. 3 is a view showing example statuses of signals having undergone white balance adjustment performed by a WB adjustment section shown in FIG. 2.

FIG. 3 is a view showing an example state of the respective signals achieved after the WB adjustment section 12 has completed white balance adjustment. As shown in FIG. 3, the R signal, the G signal, and the B signal become equal to each other in terms of the saturation level, and the saturation level of the W signal becomes lower than the saturation level of the G signal.

The synchronization processing section 13 performs synchronization processing for generating, from the R signal, the G signal, and the B signal having undergone level adjustment output from the WB adjustment section 12, color signals incapable of being acquired from the respective photoelectric conversion element, at pixel positions on the memory corresponding to the photoelectric conversion elements 1 through 4, through interpolation and by use of the color signals acquired from surrounding respective photoelectric conversion elements.

For example, a G signal and a B signal are generated at a pixel position corresponding to the photoelectric conversion element 1 through interpolation and by use of the G signal and the B signal acquired from the photoelectric conversion elements 2 and 3 located around the photoelectric conversion element 1. An R signal and a B signal are generated at a pixel position corresponding to the photoelectric conversion element 2 through interpolation and by use of the R signal and the B signal acquired from the photoelectric conversion elements 1 and 3 located around the photoelectric conversion element 2. An R signal and a G signal are generated at a pixel position corresponding to the photoelectric conversion element 3 through interpolation and by use of the R signal and the G signal acquired from the photoelectric conversion elements 1 and 2 located around the photoelectric conversion element 3. An R signal, a G signal, and a B signal are generated at a pixel position corresponding to the photoelectric conversion element 4 through interpolation and by use of the R signal, the G signal, and the B signal acquired from the photoelectric conversion elements 1, 2, and 3 located around the photoelectric conversion element 4.

The brightness signal generation section 14 respectively weights the P signal, the G signal, and the B signal generated at the pixel positions corresponding to the respective photoelectric conversion elements of the first group by means of given coefficients ($\alpha$, $\beta$, and $\gamma$) and adds the thus-weighted signals together, as indicated by Equation (1) provided below, thereby generating brightness signals Yrgb generated at the pixel positions.

$$\text{Brightness signal } Yrgb = \alpha \times R \text{ signal} + \beta \times G \text{ signal} + \gamma \times B \text{ signal} \quad (1)$$

Figure 4:
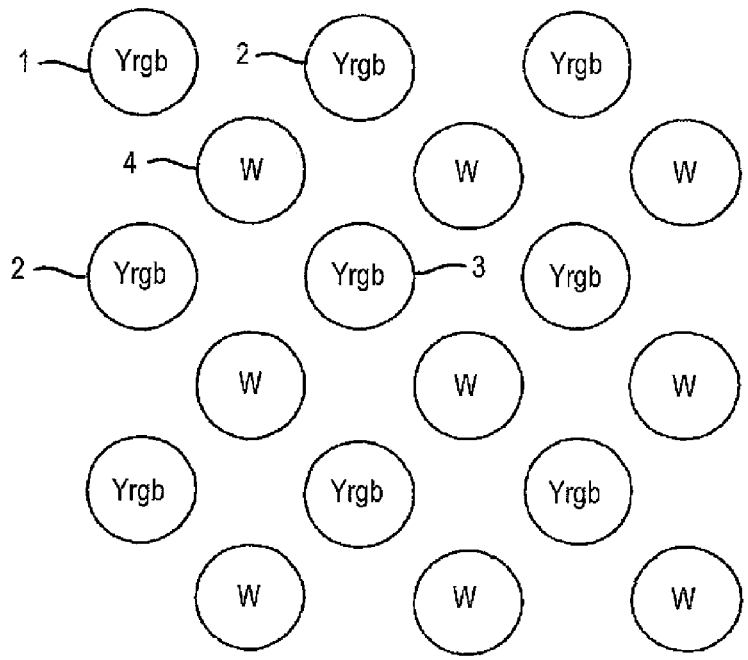
FIG. 4 is a view showing brightness signals generated in correspondence to pixel positions of image data.

As shown in FIG. 4, the brightness signals Yrgb generated by the brightness signal generation section 14 are arranged at the pixel positions on the memory corresponding to the respective photoelectric conversion elements 1, 2, and 3 by means of brightness signal generation processing performed by the brightness signal generation section 14. A W signal that is acquired from the photoelectric conversion element 4 and has undergone white balance adjustment is arranged at the pixel position corresponding to the photoelectric conversion element 4.

In order to increase a saturation level of the W signal, to thus enlarge a dynamic range, the W signal correction section 15 performs processing for correcting the W signal through use of the brightness signals Yrgb. For instance, the W signal correction section 15 adds, at a given ratio, the W signal and the brightness signals Yrgb from the photoelectric conversion elements located around the photoelectric conversion element 4 generating the W signal, thereby determining a corrected brightness signal W'.

Figure 5:
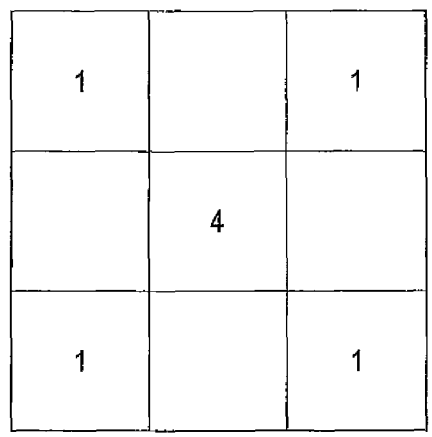
FIG. 5 is a view showing example of a filter coefficient.

For instance, an average $\{(W+Yrgb)/2\}$ of the W signal situated at an arbitrary position shown in FIG. 4 and the brightness signal Yrgb generated at the upper left of the W signal is determined, and the thus-determined average is taken as a brightness signal W'. Alternatively, the W signal situated at an arbitrary position shown in FIG. 4 and four brightness signals Yrgb generated at positions around the signal are subjected to filtering indicated by Equation (2) provided below through use of a filter having a coefficient, such as that shown in FIG. 5, thereby determining a brightness signal W'.

$$W' = (4 \times W + 1 \times Yrgb + 1 \times Yrgb + 1 \times Yrgb + 1 \times Yrgb)/(4+1+1+1+1) \quad (2)$$

Figure 6:
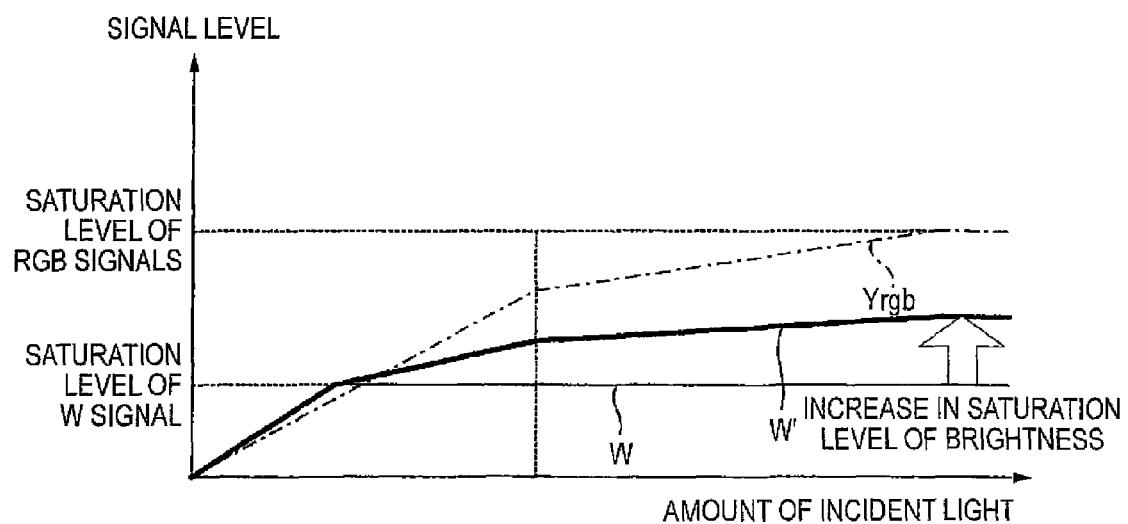
FIG. 6 is a view showing a result of correction performed under a correction method described in connection with the first embodiment.

FIG. 6 is a view showing a relationship among the W signal situated at an arbitrary pixel position, the brightness signals Yrgb situated at a pixel position in close proximity to the upper left of the pixel position, and the brightness signal W' obtained after correction of the W signal. The brightness signal W' turns into a signal obtained as a result of addition of the W signal to the brightness signals Yrgb at a given ratio. Hence, a saturation level of the brightness signal W' ascends to a level between the saturation level of the G signal and the saturation level of the W signal, as shown in FIG. 6.

Thus, by means of correction operation using the brightness signals Yrgb, the imaging device of the present embodiment can increase the saturation level of the W signal decreased through white balance adjustment. Therefore, the dynamic range of the brightness signal acquired from the photoelectric conversion element 4 can be increased, and generating image data by utilization of the signal enables photographing that effectively prevents occurrence of loss of a white color, a matte black color, and the like. Color reproducibility is determined by the R signal, the G signal, and the B signal used for white balance adjustment. However, the R signal, the G signal, and the B signal maintain levels similar to those achieved in the related art. Hence, the dynamic range can be increased without affecting color reproducibility.

In the above descriptions, the plurality of photoelectric conversion elements belonging to the first group are made up of photoelectric conversion elements that detect three different color components R, G, and B. However, the essential requirement for the color components is to enable generation of a brightness signal. Namely, the color components are not limited to the primary colors RGB but may also be complementary colors or other colors. Further, the number of color components is also not limited to three but may also be four or more.

In the above descriptions, the photoelectric conversion element 4 for acquiring a brightness signal and the photoelectric conversion elements 1, 2, and 3 for acquiring color signals are arranged in square grid patterns, respectively, and all of the photoelectric conversion elements are arranged in a honeycomb pattern. However, the arrangement pattern of the photoelectric conversion elements is not limited to the honeycomb pattern. The foregoing effect can be achieved by any configuration, so long as a plurality of photoelectric conversion elements include at least three types of photoelectric conversion elements for acquiring different color signals and photoelectric conversion elements for acquiring a brightness signal located adjacent to at least the three types of photoelectric conversion elements.

Although a method for generating final image data is not explained in the foregoing descriptions, a conceivable method, for instance, is to generate at each of the pixel positions a color difference signal from the R signal, the G signal, the B signal, and the brightness signals Yrgb (or the brightness signal W') generated at the pixel positions corresponding to the respective photoelectric conversion elements 1 through 4; or to generate a brightness signal through interpolation at the pixel positions corresponding to the respective photoelectric conversion elements 1 through 3 by use of a brightness signal W' achieved around the pixel positions and a color difference signal at the respective pixel positions from the color signal and the brightness signal generated through interpolation.

Moreover, in the present embodiment, when any structural imperfection is present in the photoelectric conversion element 4 and when the brightness signal W already became an imperfection signal, it is preferable to make a correction to the imperfection signal by use of at least one brightness signal $Y_{rgb}$ corresponding to a photoelectric conversion element located around a photoelectric conversion element corresponding to the imperfection signal rather than by use of the brightness signal W corresponding to a photoelectric conversion element located around a photoelectric conversion element corresponding to the imperfection signal. For instance, when the brightness signal W is an imperfection signal, conceivable methods include a method for determining an average of brightness signals $Y_{rgb}$ corresponding to respective four photoelectric conversion elements 1 to 3 located around the photoelectric conversion element 4 corresponding to the brightness signal W and replacing the brightness signal W with the average, a method for replacing the brightness signal W with a brightness signal $Y_{rgb}$ corresponding to any one of four photoelectric conversion elements 1 through 4 located around the photoelectric conversion element corresponding to the brightness signal W, and the like.

When compared with a case where a correction is made to the brightness signal W by means of a brightness signal W located around the photoelectric conversion element corresponding to the brightness signal, a correction is made to a signal generated from a color signal located closer to a photoelectric conversion element corresponding to the brightness signal W that is an object of correction. Hence, a decrease in resolution can be prevented.

The W signal correction section 15 may also make a correction to the imperfection. Alternatively, another imperfection correction section may also be provided in the imaging device, and the imperfection correction section may correct imperfection.

(Second Embodiment)

In the present embodiment, a second embodiment of correction processing of the W signal correction section 15 in FIG. 2 will be described.

The W signal correction section 15 determines the brightness signal W' by combination of; for example, high-frequency components of the W signal with low-frequency components of the brightness signals Yrgb generated at photoelectric conversion elements of types differing from the photoelectric conversion element 4 located around the photoelectric conversion element 4 assigned to the W signal.

Example equations for generating the brightness signal W' are provided below. In the following equations, an LPF (signal) exhibits a value obtained by subjecting a parenthesized signal to low-pass filtering, and an HPF (signal) exhibits a value obtained by subjecting a parenthesized signal to high-pass filtering.

$$W'=LPF(Yrgb)+(W-LPF(W)) \quad (a)$$

$$W'=LPF(Yrgb-W)+W \quad (b)$$

$$W'=HPF(W)+(Yrgb-HPF(Yrgb)) \quad (c)$$

$$W'=HPF(W-Yrgb)+Yrgb \quad (d)$$

In the above expressions, a signal from a pixel position in close proximity to the upper left of a certain pixel position where the W signal is available or an average of four signals achieved at our pixel positions around of a pixel position where the W signal is available can be used for Yrgb.

The W signal is acquired from the photoelectric conversion elements 4 that detect a brightness component, and the photoelectric conversion elements 4 account for a half of all photoelectric conversion elements. Therefore, the W signal becomes superior to the brightness signals Yrqb in terms of a frequency characteristic (resolution sensitivity). However, the W signal becomes inferior to the brightness signals Yrgb in terms of color reproducibility. In the meantime, the brightness signals Yrgb are acquired from the photoelectric conversion elements 1, 2, 3 that detect color components. Therefore, the brightness signals Yrgb become superior to the W signal in terms of color reproducibility. However, the brightness signals Yrgb become inferior to the W signal in terms of the frequency characteristic. In short, the W signal and the brightness signals Yrgb have advantageous characteristics and disadvantageous characteristics, respectively.

In the present embodiment, the W signal correction section 15 combines the high-frequency components of the W signal with the low-frequency components of the brightness signals Yrgb, to thus generate the brightness signal W'. In short, the W signal exhibiting a superior frequency characteristic is used for the high-frequency components that affect resolution, and the brightness signals Yrgb are used for the low-frequency components that affect color reproducibility, so that the brightness signal W' exhibiting both the advantage of the W signal and the advantages of the brightness signal Yrgb can be acquired. Since processing for combination of the signal is performed, the saturation level of the W signal can be increased when compared with the first embodiment where the plurality of brightness signals are simply added together at a given ratio.

The essential requirement is to optimally determine, in conformance to desired image quality, a frequency-component range of the high-frequency components of the W signal and a frequency-component range of the low-frequency components of the brightness signals Yrgb. If an image exhibiting superior resolution sensitivity is desired, it would be better to broaden the range of the high-frequency components of the W signal. Alternatively, if an image exhibiting superior color reproducibility is desired, it would be better broaden the range of the low-frequency components of the brightness signals Yrqb. It is better for the W signal correction section 15 to set such a range in accordance with the image quality set during photographing operation.

Further, in the present embodiment, when any structural imperfection is present in the photoelectric conversion element 4 and when the brightness signal W already became the imperfection signal, it is preferable to make a correction to an imperfection by means of setting a high-frequency component of the brightness signal to zero. Thus, a necessity for correcting an imperfection signal by means of performing interpolation by use of another signal corresponding to a photoelectric conversion element located around a photoelectric conversion element corresponding to the brightness signal or a necessity for performing arithmetic operation by means of replacing the brightness signal with another signal is obviated. Hence, cost can be curtailed. Further, even when the high-frequency component of the brightness signal W is set to zero, the brightness signal W' includes a low-frequency component of the brightness signal $Y_{rgb}$. Hence, the minimum color reproducibility can be ensured.

The W signal correction section 15 may correct the imperfection. Alternatively, another imperfection correction section may also be provided in the imaging device, and imperfection correction may also be performed in the section.

(Third Embodiment)

In a present embodiment, a third example of correction processing of the W signal correction section 15 shown in FIG. 2 will be described.

In a case where, when the W signal having undergone white balance adjustment is saturated, the brightness signals Yrgb from the photoelectric conversion elements, which differ from the photoelectric conversion elements 4 located around the photoelectric conversion element 4 assigned to the W signal, are higher in level than the W signal, the W signal correction section 15 corrects the W signal by replacement of the level, which is greater than or equal to the saturation level of the W signal, with the level of the brightness signals Yrgb.

Figure 7:
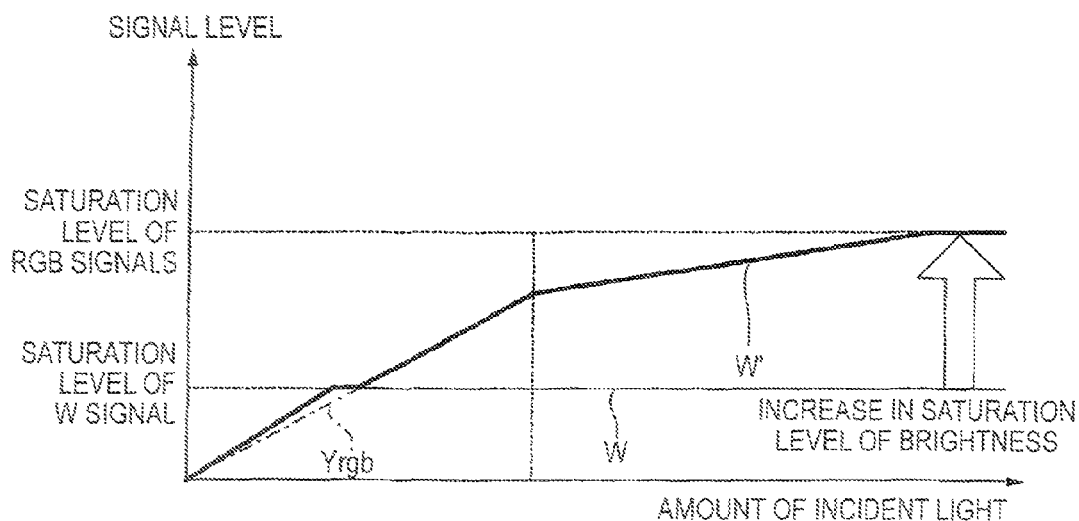
FIG. 7 is a view showing a result of correction performed under a correction method described in connection with a third embodiment.
Figure 8:
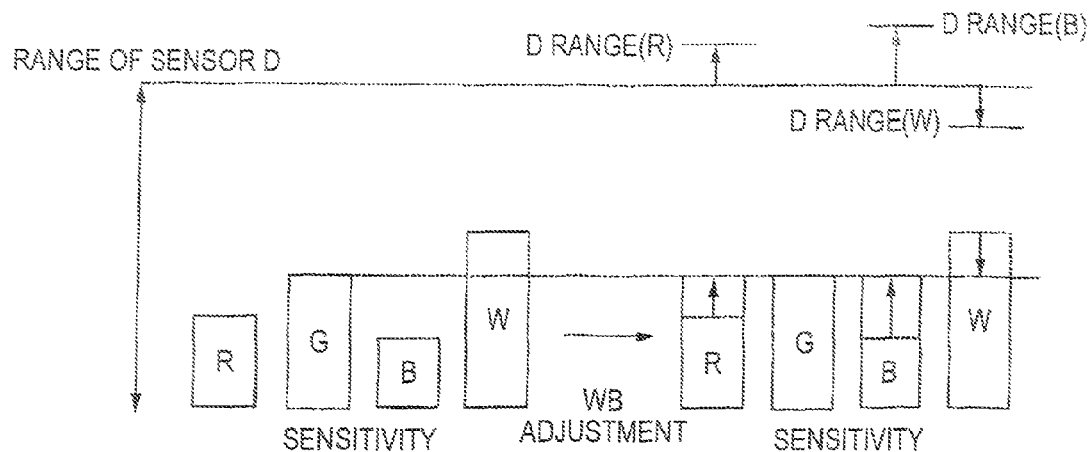
FIG. 8 is a view for describing white balance adjustment processing.

FIG. 7 is a view showing a result of correction performed under a correction method described in connection with the third embodiment.

As shown in FIG. 7, when the signal level of the brightness signals Yrgb increase so as to exceed the saturation level of the W signal regardless of the fact that amounts of incident light fall in a high brightness range and that the W signal has become saturated, the W signal correction section 15 replaces the level that is equal to or greater than the saturation level of the W signal with levels of the brightness signals Yrgb. As a result, in the high brightness range where the level of the W signal becomes equal to or greater than the saturation level, the saturation level of the brightness signal W' becomes equal to the saturation level of the brightness signals Yrgb. Consequently, when compared with the correction method of the first embodiment, the correction method of the embodiment enables a further increase in dynamic range. Moreover, since correction is performed by replacement of a signal, processing, such as that performed under the correction methods of the first and second embodiments, becomes obviated, so that correction can be performed simpler when compared with the case of the correction methods of the first and second embodiments.

When the W signal is higher than the given level, there is also a known method for replacing a brightness signal W with a signal generated by subjecting color signals from photo-electric conversion elements located around a photoelectric conversion element corresponding to the brightness signal (see; for instance, JP-A-2008-22521). Under this method, there may arise a case where a signal generated by subjecting a color signal to weighting and addition becomes lower in level than the W signal for reasons of a difference between the color signal and the W signal in terms of a spectral characteristic, the color of a subject, and the like. Therefore, if the W signal is replaced with the signal undergone addition and weighting, the level of the W signal will become lower. For instance, in a gradation area, a decrease in level leads to a false contour and a drop in image quality.

In contrast, according to the present embodiment, the W signal is used up to a saturation level, and the brightness signal $Y_{rgb}$ is used at a level equal to or higher than the saturation level, whereby a drop in the level of the W signal can be prevented.

Moreover, in a case where the W signal has reached a given level that is lower than the saturation level rather than reaching the saturation level, when the level of the brightness signal $Y_{rgb}$ surpasses the given level, the W signal and the brightness signal, which are equal to or higher than the given level, are replaced with the signal undergone weighting and addition, whereby the W signal can be changed smoothly before and after the given level, so that continuity can be enhanced by the correction.

The essential requirement for the given level is to appropriately determine the level according to desired image quality.

For instance, a signal acquired at a pixel position in close proximity to the upper left of a certain pixel position of the W signal that is to become a target of correction or an average of fourth signals acquired at four surrounding pixel positions in close proximity to a certain pixel position of the W signal that is to become a target of correction can be used as the brightness signal Yrgb employed by the W signal correction section 15 for determination.

A case where the foregoing saturation level is set to a level that is lower than an actual saturation level in consideration of variations in manufacture of an imaging element, and the like, is also included.

The present invention enables provision of an imaging device capable of increasing a dynamic range of brightness signals acquired from brightness detection photoelectric conversion elements even when there is achieved a white balance of a signal acquired from an imaging element having color detection photoelectric conversion elements and the brightness detection photoelectric conversion elements.

The entire disclosure of each and every foreign patent application from which the benefit of foreign priority has been claimed in the present application is incorporated herein by reference, as if fully set forth.

What is claimed is:

1. An imaging device comprising:
an imaging element that comprises (i) at least three types of color detection photoelectric conversion elements that detect different color components of light and (ii) brightness detection photoelectric conversion elements that detect brightness components of light;
a level adjustment section that adjust levels of color signals acquired respectively from at least said three types of color detection photoelectric conversion elements and levels of brightness signals acquired from the brightness detection photoelectric conversion elements;
a composite signal generation section that generates, from ones of the color signals undergone level adjustment, at least three different color signals in correspondence with each of the color detection photoelectric conversion elements and subjects at least said three color signals to weighting and addition, so as to generate composite signals respectively corresponding to the color detection photoelectric conversion elements; and
a brightness signal correction section that corrects one of the brightness signals having undergone level adjustment, through use of corresponding one(s) of the composite signals,
wherein the color detection photoelectric conversion elements are arranged in a Bayer pattern, and
wherein the brightness signal correction section combines a high-frequency component of the one of the brightness signals having undergone level adjustment with a low-frequency component of the composite signal(s) corresponding to one(s) of the color detection photoelectric conversion elements located around one of the brightness detection photoelectric conversion elements generating the one of the brightness signals, so as to acquire signals as the corrected brightness signals.

2. The imaging device according to claim 1,
wherein the brightness signal correction section adds, at a given ratio: the one of the brightness signals having undergone level adjustment and composite signal(s) corresponding to one(s) of the color detection photoelectric conversion elements located around one of the brightness detection photoelectric conversion elements generating the one of the brightness signals, so as to acquire signals as the corrected brightness signals.

3. The imaging device according to claim 1,
wherein, in a case where when the one of the brightness signals becomes saturated after undergoing level adjustment, composite signal(s) corresponding to one(s) of the color detection photoelectric conversion elements located around one of the brightness detection photoelectric conversion elements generating the one of the brightness signals are higher in level than the one of the brightness signals, the brightness signal correction section performs processing for replacing a level of the one of the brightness signals with a level derived from the composite signal(s).

4. The imaging device according to claim 1,
wherein, when the one of the brightness signals having undergone level adjustment already reached a given level which is lower than a saturation level of the brightness detection photoelectric conversion elements and when level(s) of composite signal(s) corresponding to one(s) of the color detection photoelectric conversion elements located around the one of the brightness detection photoelectric conversion elements are higher than the given level, the brightness signal correction section performs correcting operation for replacing the one of the brightness signals having a level equal to or higher than the given level with a signal in which the one of the brightness signals and composite signal(s) having level(s) greater than the given level are combined.

5. The imaging device according to claim 1,
wherein, when the one of the brightness signals is an imperfection signal, the imperfection signal is corrected by use of composite signal(s) corresponding to one(s) of the color detection photoelectric conversion elements located around one of the brightness detection photoelectric conversion elements generating the one of the brightness signals.

6. The imaging device according to claim 1,
wherein, when the one of the brightness signals is an imperfection signal, the high-frequency component of the one of the brightness signals is set to 0, so as to correct the imperfection signal.

7. The imaging device according to claim 1,
wherein the imaging element comprises:
a first group including the color detection photoelectric conversion elements; and
a second group including the brightness detection photoelectric conversion elements, and
when positions of the respective photoelectric conversion elements belonging to the second group are taken as a reference, the respective photoelectric conversion elements belonging to the first group are arranged at positions offset in a given direction from the reference positions in such a way that one photoelectric conversion element belonging to the first group becomes adjacent to the respective photoelectric conversion elements belonging to the second group.

8. The imaging device according to claim 1,
wherein the color detection photoelectric conversion elements included in the imaging element are photoelectric conversion elements of three types, that is, a photoelectric conversion element that detects a red component of light, a photoelectric conversion element that detects a green component of light, and a photoelectric conversion element that detects a blue component of light.

9. An imaging device comprising:
an imaging element that comprises (i) at least three types of color detection photoelectric conversion elements that detect different color components of light and (ii) brightness detection photoelectric conversion elements that detect brightness components of light;
a level adjustment section that adjust levels of color signals acquired respectively from at least said three types of color detection photoelectric conversion elements and levels of brightness signals acquired from the brightness detection photoelectric conversion elements;
a composite signal generation section that generates, from ones of the color signals undergone level adjustment, at least three different color signals in correspondence with each of the color detection photoelectric conversion elements and subjects at least said three color signals to weighting and addition, so as to generate composite signals respectively corresponding to the color detection photoelectric conversion elements; and
a brightness signal correction section that corrects one of the brightness signals having undergone level adjustment, through use of corresponding one(s) of the composite signals,
wherein the color detection photoelectric conversion elements are arranged in a Bayer pattern, and
wherein, when the one of the brightness signals having undergone level adjustment already reached a given level which is lower than a saturation level of the brightness detection photoelectric conversion elements and when level(s) of composite signal(s) corresponding to one(s) of the color detection photoelectric conversion elements located around the one of the brightness detection photoelectric conversion elements are higher than the given level, the brightness signal correction section performs correcting operation for replacing the one of the brightness signals having a level equal to or higher than the given level with a signal in which the one of the brightness signals and composite signal(s) having level(s) greater than the given level are combined.

10. The imaging device according to claim 9,
wherein the brightness signal correction section adds, at a given ratio: the one of the brightness signals having undergone level adjustment and composite signal(s) corresponding to one(s) of the color detection photoelectric conversion elements located around one of the brightness detection photoelectric conversion elements generating the one of the brightness signals, so as to acquire signals as the corrected brightness signals.

11. The imaging device according to claim 9,
wherein, in a case where when the one of the brightness signals becomes saturated after undergoing level adjustment, composite signal(s) corresponding to one(s) of the color detection photoelectric conversion elements located around one of the brightness detection photoelectric conversion elements generating the one of the brightness signals are higher in level than the one of the brightness signals, the brightness signal correction section performs processing for replacing a level of the one of the brightness signals with a level derived from the composite signal(s).

12. The imaging device according to claim 9,
wherein, when the one of the brightness signals is an imperfection signal, the imperfection signal is corrected by use of composite signal(s) corresponding to one(s) of the color detection photoelectric conversion elements located around one of the brightness detection photoelectric conversion elements generating the one of the brightness signals.

13. The imaging device according to claim 9,
wherein the imaging element comprises:
a first group including the color detection photoelectric conversion elements; and
a second group including the brightness detection photoelectric conversion elements, and
when positions of the respective photoelectric conversion elements belonging to the second group are taken as a reference, the respective photoelectric conversion elements belonging to the first group are arranged at positions offset in a given direction from the reference positions in such a way that one photoelectric conversion element belonging to the first group becomes adjacent to the respective photoelectric conversion elements belonging to the second group.

14. The imaging device according to claim 9,
wherein the color detection photoelectric conversion elements included in the imaging element are photoelectric conversion elements of three types, that is, a photoelectric conversion element that detects a red component of light, a photoelectric conversion element that detects a green component of light, and a photoelectric conversion element that detects a blue component of light.

\* \* \* \* \*